(12) United States Patent
Koo et al.

(10) Patent No.: US 8,982,747 B2
(45) Date of Patent: Mar. 17, 2015

(54) METHOD FOR TRANSCEIVING REFERENCE SIGNAL IN COMP OPERATION IN WIRELESS COMMUNICATION SYSTEM THAT SUPPORTS AN MU-MIMO SCHEME

(75) Inventors: Ja Ho Koo, Anyang-si (KR); Moon Il Lee, Anyang-si (KR); Jae Hoon Chung, Anyang-si (KR); Bin Chul Ihm, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 13/394,981

(22) PCT Filed: Sep. 9, 2010

(86) PCT No.: PCT/KR2010/006148
§ 371 (c)(1),
(2), (4) Date: Mar. 8, 2012

(87) PCT Pub. No.: WO2011/031079
PCT Pub. Date: Mar. 17, 2011

(65) Prior Publication Data
US 2012/0170679 A1    Jul. 5, 2012

Related U.S. Application Data

(60) Provisional application No. 61/241,023, filed on Sep. 9, 2009.

(30) Foreign Application Priority Data

Feb. 5, 2010  (KR) ........................ 10-2010-0010834

(51) Int. Cl.
*H04L 5/14* (2006.01)
*H04B 7/02* (2006.01)
*H04B 7/04* (2006.01)
*H04L 5/00* (2006.01)

(52) U.S. Cl.
CPC .............. *H04B 7/024* (2013.01); *H04B 7/0452* (2013.01); *H04L 5/0023* (2013.01); *H04L 5/0032* (2013.01); *H04L 5/0035* (2013.01); *H04L 5/0048* (2013.01)
USPC ............................................................. 370/295

(58) Field of Classification Search
None
See application file for complete search history.

(56) References Cited

U.S. PATENT DOCUMENTS 8,548,479 B2 * 10/2013 Kim et al. ..................... 455/444
2010/0272032 A1 * 10/2010 Sayana et al. ................. 370/329

OTHER PUBLICATIONS

3G Americas, "MIMO Transmission Schemes for LTE and HSPA Networks", Jun. 2009, 50 pages, See p. 31, line 1-p. 37, line 7.
Jung Ah C. Lee, "Coordinated Multi-point Transmission in 3GPP LTE-Advanced", ITC-CSCC: pp. 1609-1612, Jul. 2009, Portions of this document were presented in 3GPP LTE standards forum, See p. 1611, left column, line 1-p. 1612, right column, line 23.

* cited by examiner

*Primary Examiner* — Kouroush Mohebbi
(74) *Attorney, Agent, or Firm* — McKenna Long & Aldridge LLP (57) ABSTRACT

Disclosed is a method for efficiently transceiving information required for implementing a multi-cell-based CoMP MU-MIMO scheme. For this purpose, a base station which performs CoMP operation generates: (A) a reference signal sequence on the basis of a specific base station; or generates (B) the same reference signal sequence on the basis of a CoMP ID, and transmits the generated sequence to user equipment. To support an MU-MIMO scheme and to perform a joint processing method, the base station must additionally transmit CoMP reference signal sequence information, frequency shift information, etc. to the user equipment in said (A) case, and generates a CoMP reference signal on the basis of a preset CoMP set ID and transmits the generated signal to the user equipment in said (B) case.

9 Claims, 7 Drawing Sheets

METHOD FOR TRANSCEIVING REFERENCE SIGNAL IN COMP OPERATION IN WIRELESS COMMUNICATION SYSTEM THAT SUPPORTS AN MU-MIMO SCHEME

This application is a 35 U.S.C. §371 National Stage entry of International Application No. PCT/KR2010/006148, filed on Sep. 9, 2010, and claims the benefit of U.S. Provisional Application No. 61/241,023, filed on Sep. 9, 2009, and Korean Patent Application No. 10-2010-0010834, filed Feb. 5, 2010, all of which are incorporated by reference in their entirety herein.

TECHNICAL FIELD

The present invention relates to a wireless communication system, and more particularly, to a method for transmitting and receiving a reference signal in a CoMP operation in a wireless communication system that supports an multiple user-Multiple Input Multiple Output (MU-MIMO) scheme, and a user equipment and a base station for performing the method.

BACKGROUND ART

Recently, a Multiple Input Multiple Output (MIMO) system has been spotlighted as a wideband wireless mobile communication technology. The MIMO system refers to a system capable of improving data communication efficiency using multiple antennas. The MIMO system may be classified into a space multiplexing scheme and a space diversity scheme, depending on whether or not the same data is transmitted.

The space multiplexing scheme refers to a scheme for simultaneously transmitting different data via a plurality of transmission antennas so as to rapidly transmit data without increasing system bandwidth. The space diversity scheme refers to a scheme for transmitting the same data via a plurality of transmission antennas so as to obtain transmission diversity. Examples of such a space diversity scheme include a space time channel coding scheme.

In addition, the MIMO technology may be classified into an open loop scheme and a closed loop scheme according to feedback of channel information from a reception side to a transmission side. The open loop scheme includes a Space-Time Trellis Code (STTC) scheme in which a transmission side transmits information in parallel, and a reception side detects a signal using a Zero Forcing (ZF) scheme and a Minimum Mean Square Error (MMSE) scheme repeatedly and obtains transmission diversity and coding gain using a space domain and Bell Laboratories Layered Space-Time (BLAST) for increasing information amount by the number of transmission antennas, or the like. The closed loop scheme includes a Transmit Antenna Array (TxAA) scheme, or the like.

A coordinated multi-point (CoMP) system (hereinafter, referred to as a CoMP system) is a system for improving throughput of a user located at a cell boundary by applying improved MIMO transmission in a multi-cell environment. If a CoMP system is applied, it is possible to inter-cell interference in a multi-cell environment. If such a CoMP system is used, a user equipment (UE) can commonly receive data from a multi-cell base station.

In addition, each base station simultaneously supports one or more UEs UE 1, UE 2, . . . , and UE K using the same radio frequency resources, thereby improving system performance. In addition, the base station may perform a space division multiple access (SDMA) method based on channel state information (CSI) between the base station and the UE.

Such a CoMP scheme may be divided into a coordinated MIMO joint processing (JP) scheme through data sharing and a coordinated scheduling/beamforming (CS/CB) scheme.

Figure 1:
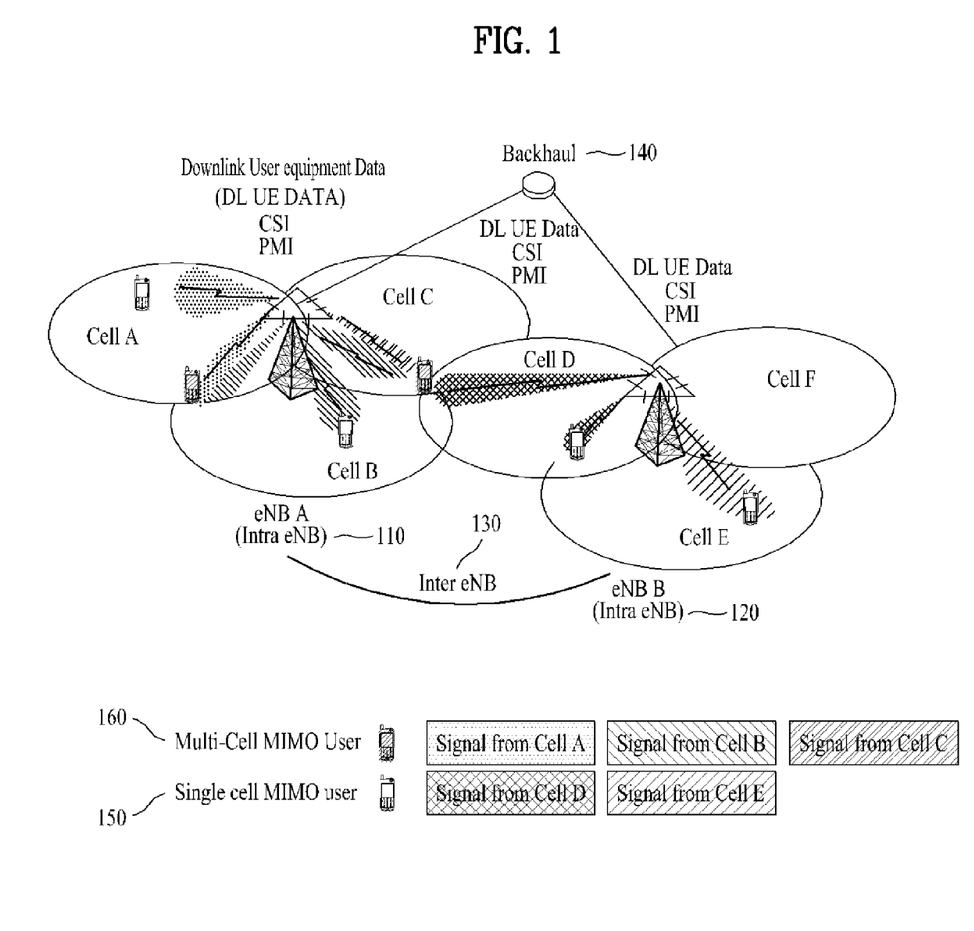
FIG. 1 is a conceptual diagram of Coordinated Multi-Point (CoMP) of intra BSs and inter BSs.

FIG. 1 is a conceptual diagram of Coordinated Multi-Point (CoMP) of intra base stations (BS) (or eNBs) and inter BSs (eNBs).

Referring to FIG. 1, intra BSs 110 and 120 and an inter BS 130 are present in a multi-cell environment. In a Long Term Evolution (LTE) system, the intra BS is composed of several cells (or sectors). Cells belonging to BSs to which specific UEs belong correspond to the intra BSs 110 and 120 for the specific UEs. That is, cells which share the same BSs as cells to which UEs belong correspond to intra BSs 110 and 120 and cells belonging to different BSs correspond to the inter BS 130. Cells based on the same BSs as specific UEs may exchange information (e.g., data, channel state information (CSI)) via an x2 interface, but cells based on different BSs may exchange inter-cell information via a backhaul 140.

As shown in FIG. 1, a single-cell MIMO user 150 located in a single cell may communicate with one serving BS in one cell (sector), and a multi-cell MIMO user 160 located at a cell boundary may communicate with a plurality of serving BSs in multiple cells (sectors).

If such a CoMP system is used, a UE may commonly receive data from multi-cell BSs (eNBs). That is, in a multi-cell environment, communication performance of a UE located at a cell boundary can be improved using the CoMP operation. When UEs belonging to cells which perform a CoMP operation perform multi-user-MIMO (MU-MIMO), CoMP sets may overlap. Due to such a problem, UEs belonging to different cells for performing CoMP MU-MIMO may not be aware of which reference signals are transmitted by BSs for performing the CoMP operation. If UEs are not aware of the reference signals of the BSs for performing the CoMP operation, communication performance may be deteriorated when CoMP MU-MIMO is performed.

DISCLOSURE

Technical Problem

An object of the present invention is to provide a method of receiving a reference signal in a CoMP operation of a user equipment (UE).

Another object of the present invention is to provide a method of transmitting a reference signal in a CoMP operation of a base station (BS).

Another object of the present invention is to provide a UE for receiving a reference signal in a CoMP operation.

Another object of the present invention is to provide a BS for transmitting a reference signal in a CoMP operation.

The technical problems solved by the present invention are not limited to the above technical problems and those skilled in the art may understand other technical problems from the following description.

Technical Solution

The object of the present invention can be achieved by providing a method of receiving a reference signal in a CoMP operation of a user equipment (UE). In the method, reference signal information of a reference base station within the CoMP set or cell ID information of the reference base station is received from a base station to which a specific UE belongs in the CoMP set. A reference signal of the reference base station is acquired using the received reference signal information of the reference base station or cell ID information of the reference base station. Channel estimation is performed or the received data is demodulated using the acquired reference signal of the reference base station and a reference signal of the base station to which the specific UE belongs. At this time, the reference signal of the base station to which the specific UE belongs is generated in the same pattern as the reference signal of the reference base station.

In another aspect of the present invention, there is provided a method of transmitting a reference signal in a CoMP operation of a base station. In the method, reference signal information of a reference base station within the CoMP set or cell ID information of the reference base station is transmitted to a UE. The base station generates and transmits a reference signal in the same pattern as a reference signal of the reference base station using the received cell ID information of the reference base station or reference signal information of the reference base station.

In another aspect of the present invention, there is provided a user equipment including a reception unit configured to receive reference signal information of a reference base station within a CoMP set or cell ID information of the reference base station from a base station to which a specific user equipment (UE) belongs in the CoMP set for performing the CoMP operation, a reference signal acquisition unit configured to acquire a reference signal of the reference base station using the received reference signal information of the reference base station or cell ID information of the reference base station, and a unit configured to perform channel estimation or demodulate the received data using the acquired reference signal of the reference base station and a reference signal of the base station to which the specific UE belongs. At this time, the reference signal of the base station to which the specific UE belongs is generated in the same pattern as the reference signal of the reference base station.

In another aspect of the present invention, there is provided a base station including a reception unit configured to receive reference signal information of a reference base station within a CoMP set for performing the CoMP operation or cell ID information of the reference base station, a reference signal generation unit configured to generate a reference signal in the same pattern as a reference signal of the reference base station using the received cell ID information of the reference base station or reference signal information of the reference base station, and a transmission unit configured to transmit the generated reference signal to a user equipment (UE).

Advantageous Effects

According to the present invention, since a base station efficiently transmits necessary information to a user equipment (UE) and the UE performs communication using received information in multi-cell based CoMP MU-MIMO, it is possible to improve communication performance of the UE located at a cell boundary.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a $3^{rd}$ Generation Partnership Project (3GPP) Long Term Evolution (LTE) system, but the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE), a mobile station (MS) and an advanced mobile station (AMS), and a base station includes a node of a network end communicating with a terminal, such as a Node-B, an eNode B, a base station and an access point (AP).

In a mobile communication system, a user equipment (UE) may receive information from a base station (BS) in the downlink and transmit information to the BS in the uplink. Information transmitted or received by the UE includes data and a variety of control information and various physical channels exist according to the kind of information transmitted or received by the UE.

Figure 2:
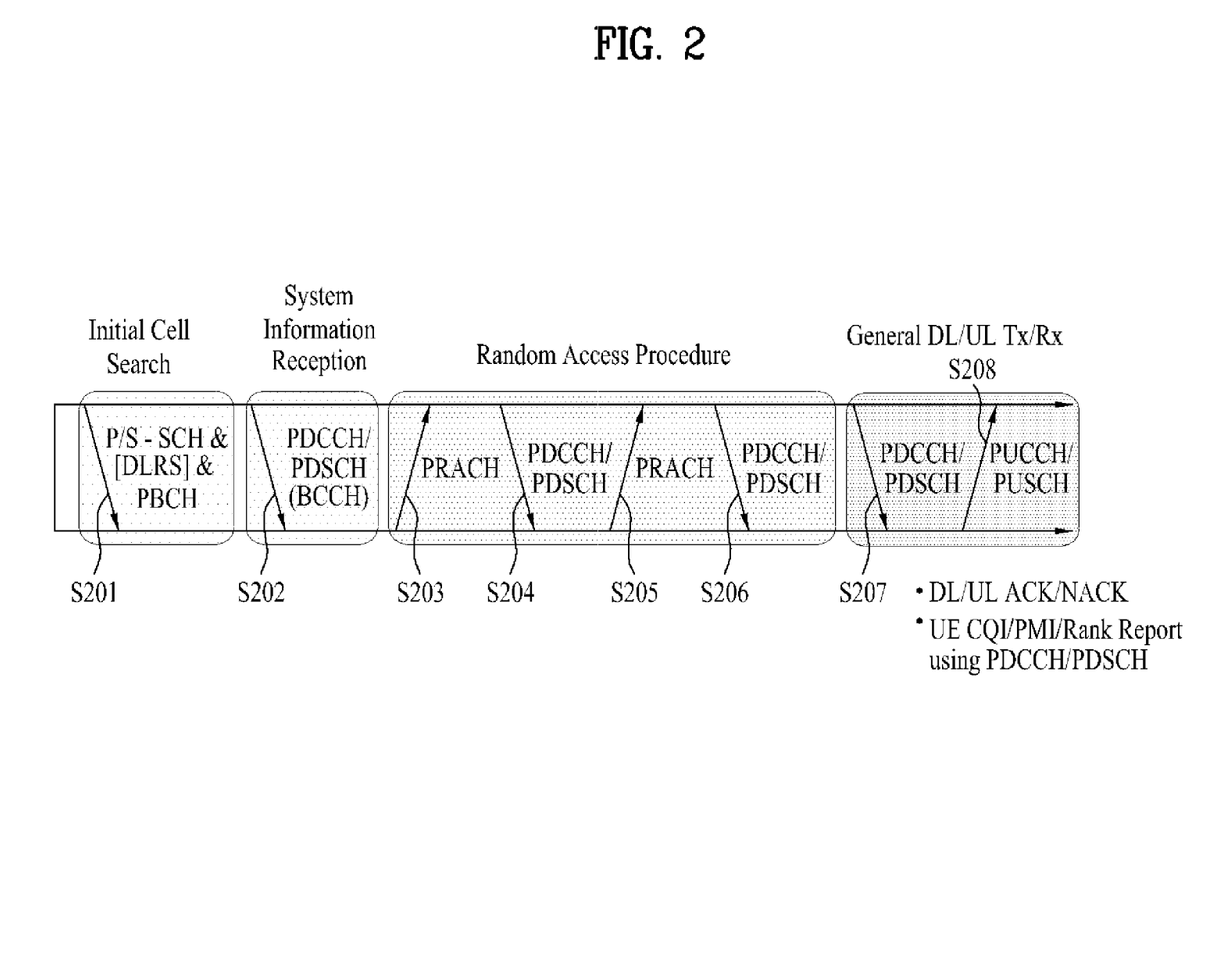
FIG. 2 is a diagram showing physical channels used in $3^{rd}$ Generation Partnership Project (3GPP) Long Term Evolution (LTE) system as an example of a mobile communication system and a general signal transmission method using the same.

FIG. 2 is a diagram showing physical channels used in a $3^{rd}$ Generation Partnership Project (3GPP) Long Term Evolution (LTE) system as an example of a mobile communication system and a general signal transmission method using the same.

Referring to FIG. 2, a UE performs an initial cell search operation such as synchronization with a BS when power is turned on or the UE enters a new cell (S201). The UE may receive a Primary Synchronization Channel (P-SCH) and a Secondary Synchronization Channel (S-SCH) from the BS, perform synchronization with the BS, and acquire information such as a cell ID. Thereafter, the UE may receive a physical broadcast channel from the BS so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S202).

Meanwhile, if the BS is initially accessed or radio resources for signal transmission are not present, the UE may perform a Random Access Procedure (RACH) (step S203 to S206) with respect to the BS. In this case, the UE may transmit a specific sequence through a Physical Random Access Channel (PRACH) as a preamble (S203), and receive a response message of the preamble through the PDCCH and the PDSCH corresponding thereto (S204). In contention-based random access excluding handover, a contention resolution procedure including the transmission of an additional PRACH (S205) and the reception of the PDCCH and the PDSCH corresponding thereto (S206) may be performed.

The UE which performs the above procedures may perform PDCCH/PDSCH reception (S207) and Physical Uplink Shared Channel PUSCH)/Physical Uplink Control Channel (PUCCH) transmission (S208) as a general uplink/downlink signal transmission procedure. The control information transmitted from the UE to the BS in the uplink or transmitted from the BS to the UE in the downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 3:
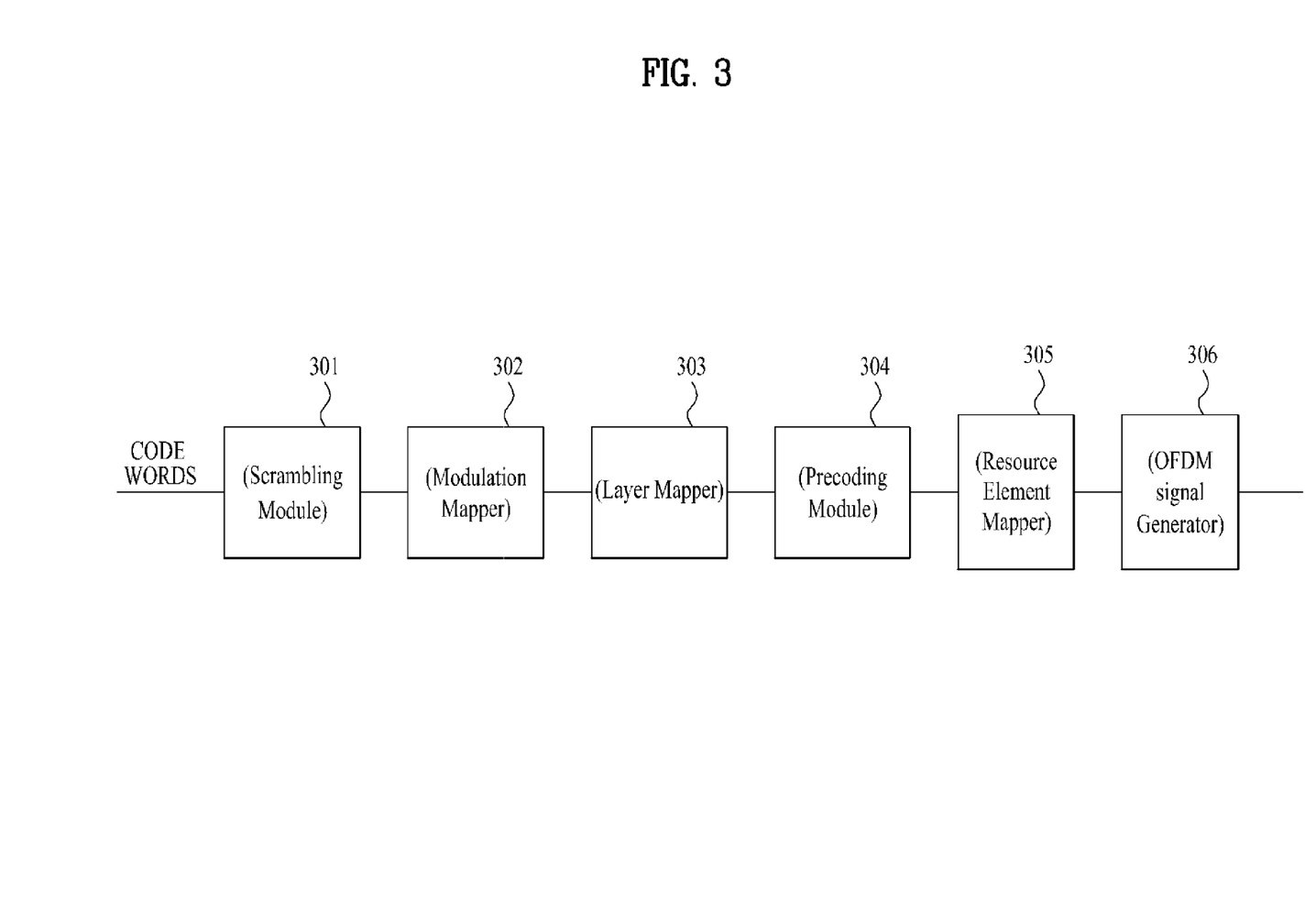
FIG. 3 is a signal processing procedure for transmitting a downlink signal at a BS in a 3GPP LTE system as an example of a mobile communication system.

FIG. 3 is a signal processing procedure for transmitting a downlink signal at a BS in a 3GPP LTE system as an example of a mobile communication system.

In a 3GPP LTE system, the BS may transmit one or more codewords in the downlink. Accordingly, one or more codewords may be processed to configure complex symbols by a scrambling module 301 and a modulation mapper 302. Thereafter, the complex symbols are mapped to a plurality of layers by a layer mapper 303, and each layer may be multiplied by a predetermined precoding matrix selected according to a channel state by a precoding module 304 and may be allocated to each transmission antenna. The processed signals which will respectively be transmitted via antennas may be mapped to time-frequency resource elements to be used by a resource element mapper 305, and may respectively be transmitted via an OFDM signal generator 306 and antennas.

Figure 4:
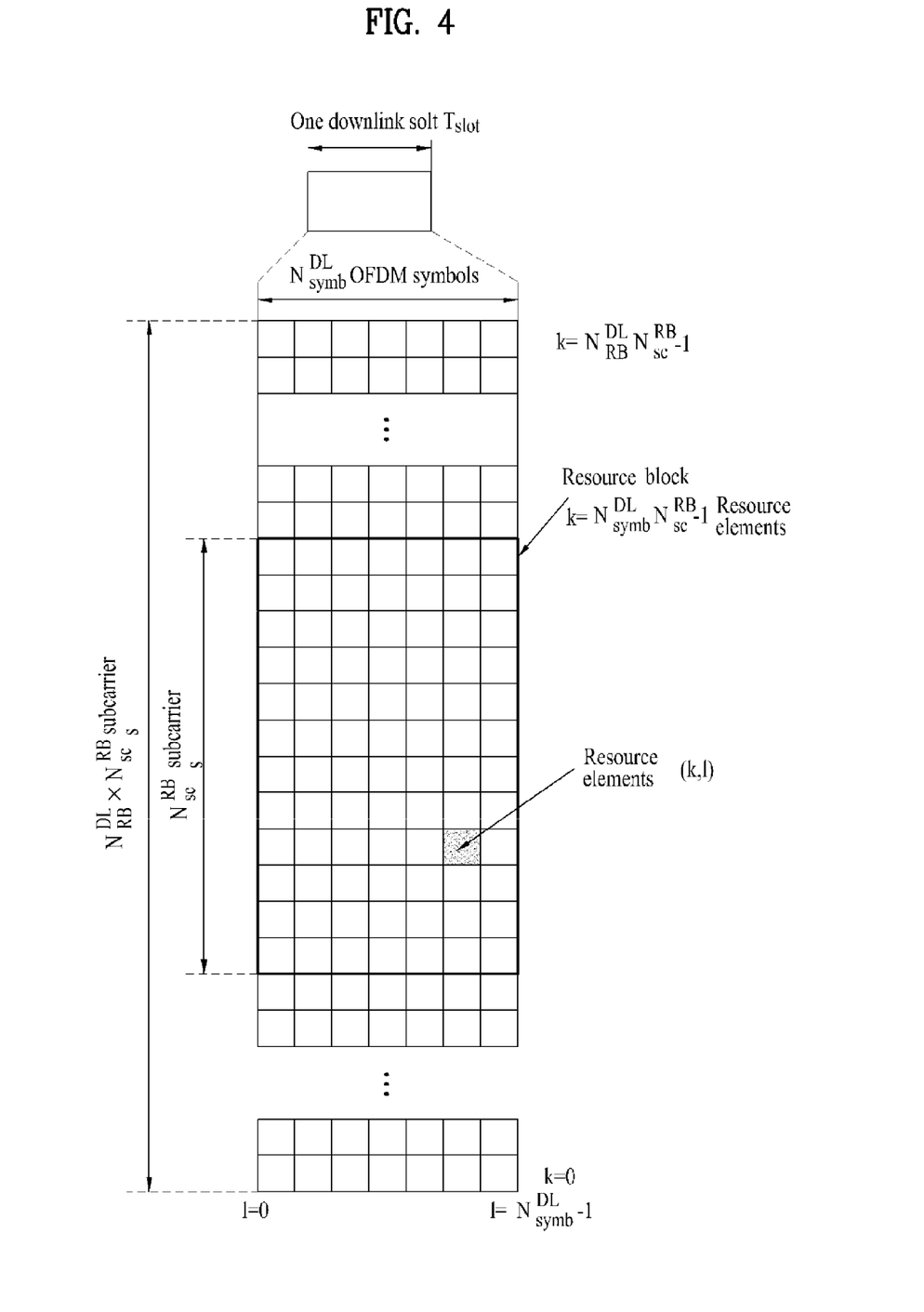
FIG. 4 is a diagram showing a time-frequency resource grid structure of the downlink used in the present invention.

FIG. 4 is a diagram showing a time-frequency resource grid structure of the downlink used in the present invention.

A downlink signal transmitted at each slot may be expressed by a resource grid including $N_{RB}^{DL} \times N_{SC}^{RB}$ subcarriers. Here, $N_{RB}^{DL}$ denotes the number of Resource blocks (RBs) in the downlink, $N_{SC}^{RB}$ denotes the number of subcarriers configuring one RB, and $N_{symb}^{DL}$ denotes the number of OFDM symbols in one downlink slot. $N_{RB}^{DL}$ should satisfy $N_{RB}^{min,DL} \leq N_{RB}^{DL} \leq N_{RB}^{max,DL}$. Here, $N_{RB}^{min,DL}$ denotes a minimum downlink bandwidth supported by a wireless communication system and $N_{RB}^{max,RB}$ denotes a maximum downlink bandwidth supported by a wireless communication system. Although $N_{RB}^{min,DL}=6$ and $N_{RB}^{max,RB}=110$, the present invention is not limited thereto. The number of OFDM symbols included in one slot may be changed according to a cyclic prefix (CP) length and a subcarrier interval. In case of multi-antenna transmission, one resource grid may be defined per antenna port.

Each element in the resource grid for each antenna port is referred to as a resource element (RE) and is uniquely identified by an index pair (k, l) in a slot. Here, k denotes an index of a frequency domain, l denotes an index of a time domain, k has any one value of $0, \ldots, N_{RB}^{DL}N_{SC}^{RB}-1$ and l has any one value of $0, \ldots,$ and $N_{symb}^{DL}-1$.

Resource blocks (RBs) shown in FIG. 4 are used to describe a mapping relationship between physical channels and REs. The RB may be divided into a physical resource block (PRB) and a virtual resource block (VRB). One PRB is defined by $N_{symb}^{DL}$ consecutive OFDM symbols of the time domain and $N_{SC}^{RB}$ consecutive subcarriers of the frequency domain. Here, $N_{symb}^{DL}$ and $N_{SC}^{RB}$ may have predetermined values. For example, $N_{symb}^{DL}$ and $N_{SC}^{RB}$ may be given as shown in Table 1. Accordingly, one PRB includes $N_{symb} \times N_{SC}^{RB}$ REs. One PRB corresponds to one slot in the time domain and corresponds to 180 kHz in the frequency domain, but the present invention is not limited thereto.

TABLE 1

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The term "base station" as used in the present invention includes a cell or a sector. If the term "base station" has the concept of region, the term "base station" may be called a cell or a sector. A serving BS (or cell) may be regarded as a BS (or cell) for providing a main service to a UE and may transmit and receive control information on multiple coordinated transmission points. Thus, the serving BS may be referred to as an anchor BS (or anchor cell). A serving BS may transmit a variety of information received from a UE to a neighboring BS (cell). Similarly, if a neighboring BS has the concept of a region, the neighboring BS may be called a neighboring cell. In the present invention, one CoMP set refers to a set of cells which can perform the CoMP operation.

If the CoMP scheme is used in a multi-cell environment, communication performance of a UE located at a cell boundary can be improved. Such a CoMP scheme includes a coordinated MIMO joint processing (JP) scheme through data sharing, a coordinated scheduling/beamforming (CS/CB) scheme for reducing inter-cell interference, such as worst companion or best companion, and a transmission process (e.g., multi-antenna) scheme of geographically separate points.

From among these, in particular, the coordinated CS/CB scheme is a method of reducing inter-cell interference, which can reduce interference from a neighboring cell by transmitting a limited and/or recommended PMI from a UE to a serving BS. Here, a worst companion scheme refers to a method of reporting, to a serving BS, a PMI having highest interference with respect to cells which perform the CoMP operation and eliminating inter-cell interference using the second best excluding the PMI. The best companion scheme refers to a method of reporting a PMI having lowest interference with respect to cells which perform the CoMP operation and reducing inter-cell interference by utilizing the PMI at neighboring cells.

A MIMO scheme includes a single user-MIMO (SU-MIMO) scheme of allocating all antenna resources of a BS to one user and a multiple user-MIMO (MU-MIMO) for distributing antenna resources or radio space resources to a plurality of users. UEs belonging to different cells for performing CoMP MU-MIMO in a multi-cell environment need to be aware of which reference signals are transmitted by BSs for performing the CoMP operation, in order to perform CoMP MU-MIMO. That is, UEs may perform accurate channel estimation based on such reference signals.

A scheme for transmitting a desirable signal from multiple cells which perform the CoMP operation to a UE located at a cell boundary using the same resource domain (time/frequency domain) is referred to as a coherent or RF combining scheme. For such an RF combining scheme, an inter-cell MIMO scheme through inter-cell coordination is applicable. Such a MIMO scheme includes a transmission diversity (TxD) scheme, such as a single frequency network (SFN) transmission scheme for transmitting the same data between cells or a space time block code (SFBC) scheme, or a spatial multiplexing (SM) scheme of a higher layer.

In coherent MIMO transmission between multiple cells, if data is transmitted using reference signals based on different cell IDs per cell, communication performance may be deteriorated. Collision may occur between data REs and reference signals due to different reference signal sequences and patterns of multiple cells and leads to deterioration in channel estimation performance of a UE. Even when a transmission diversity scheme such as an SFBC scheme is used, different reference signals of multiple cells may break pairing between data for obtaining diversity gain.

In order to solve a problem of a coherent JP scheme due to use of different reference signals of multiple cells, reference signal sequences and patterns of cells belonging to the CoMP set for performing the coherent JP scheme may be equally maintained. That is, the above problem can be solved by transmitting the same reference signal at multiple cells which perform the CoMP operation based on the same cell ID using the same resource domain (time/frequency domain).

Hereinafter, various embodiments of a method of generating a CoMP reference signal sequence at multiple cells will be described.

As one embodiment of a method of generating a CoMP reference signal sequence according to the present invention, on the assumption that a reference signal sequence r(m) is mapped to a complex-value modulation symbol $a_{k,l}^{(p)}$ using an antenna port 5, the CoMP reference signal sequence may be generated using Equation 1.

$$a_{k,l}^{(p)} = r(3 \cdot l' \cdot N_{RB}^{PDSCH} + m')$$ Equation 1

$$k = (k') \mathrm{mod} N_{sc}^{RB} + N_{sc}^{RB} \cdot n_{PRB}$$

$$k' = \begin{cases} 4m' & \text{if } l \in \{2, 3\} \\ 4m' + 2\mathrm{mod}4 & \text{if } l \in \{5, 6\} \end{cases}$$

-continued $$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \, \mathrm{mod}2 = 0 \\ 2, 3 & \text{if } n_s \, \mathrm{mod}2 = 1 \end{cases}$$

$$m' = 0, 1, \ldots , 3N_{RB}^{PDSCH} - 1$$

At this time, the CoMP reference signal sequence is generated using Equation 2 excluding a cell-specific frequency shift equation $v_{shift} = N_{ID}^{cell} \mathrm{mod} \, 3$. A neighboring cell which performs the CoMP operation (coherent JP operation) may generate a reference signal sequence based on a demodulation reference signal (DRS) sequence of a serving cell and transmit the reference signal sequence to a UE in the same pattern.

In addition, as another embodiment of the method of generating the CoMP reference signal sequence according to the present invention, CoMP set IDs $N_{ID}^{CoMPset}$ are set in advance and the reference signal sequence is generated using Equation 2 based on the same CoMP set ID among CoMP set IDs set in advance by a serving cell and neighboring cells which perform the CoMP operation.

$$k = (k') \mathrm{mod} N_{sc}^{RB} + N_{sc}^{RB} \cdot n_{PRB}$$ Equation 2

$$k' = \begin{cases} 4m' + v_{CoMP\_shift} & \text{if } l \in \{2, 3\} \\ 4m' + (2 + v_{CoMP\_shift}) \mathrm{mod}4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \, \mathrm{mod}2 = 0 \\ 2, 3 & \text{if } n_s \, \mathrm{mod}2 = 1 \end{cases}$$

$$m' = 0, 1, \ldots , 3N_{RB}^{PDSCH} - 1$$

Neighboring cells may transmit the reference signal sequence generated using Equation 2 to a UE in the same pattern. In Equation 2, the same DRS sequence and pattern of cells belonging to a specific CoMP set may be generated using a CoMP set-specific frequency shift equation $v_{CoMP\_shift} = N_{ID}^{CoMPset} \mathrm{mod} \, N$.

As described above, in order to smoothly perform a multi-cell CoMP scheme, cells which perform the CoMP operation may generate the same reference signal sequence and transmit the reference signal sequence to a UE in the same pattern.

A JP scheme in which a UE located at a cell boundary receives a desirable signal from neighboring cells which perform a CoMP operation may be divided into an SU-MIMO scheme and an MU-MIMO scheme. Multiple BSs configuring one CoMP set allocate all resources to one UE in the SU-MIMO scheme and multiple BSs allocate resources to a plurality of UEs in the MU-MIMO scheme.

If multiple cells perform the SU-MIMO scheme with respect to one specific UE in a CoMP set, it is not necessary to inform the UE which performs the CoMP operation of cell information using a PDCCH (e.g., if multiple cells belonging to a CoMP set generate a CoMP reference signal based on a reference signal sequence of a serving cell). However, if multiple cells operate for several UEs in one CoMP set in the MU-MIMO mode using a JP scheme, it may be necessary to inform the UEs of CoMP reference signal information. In the case in which UEs which perform the CoMP operation are allocated different PRBs and are operated in the MU-MIMO mode, it is not necessary to inform the UEs of CoMP reference signal information if a CoMP reference signal is generated based on a BS to which a UE using a specific physical RB belongs, but it is necessary to inform the UEs of the CoMP reference signal information if several UEs which perform multi-cell MU-MIMO share a specific physical RB. That is, if the CoMP reference signal is generated based on a serving cell of a specific UE, since a CoMP UE belonging to another BS is not aware of CoMP reference signal information, communication performance of the UE may be deteriorated. The following methods for solving such problems may be considered.

First, the case of generating a CoMP reference signal sequence based on a specific BS will be described.

If several UEs perform an MU-MIMO mode using the same physical RB within one CoMP set, the UEs should be accurately aware of which reference signal sequence is used in the CoMP set, in order to perform efficient channel estimation and data demodulation. In the case in which a BS of one CoMP set operates in an SU-MIMO mode for one UE and uses a reference signal sequence of a serving cell, the BS may not inform the UE of additional information of the CoMP reference signal.

However, in the case in which a BS operates in an MU-MIMO mode for several UEs, since BSs to which the UEs belong may be different, there is no criterion for setting a serving cell from the viewpoint of the CoMP set. For example, it is assumed that a UE 1 and a UE 2 belong to a cell A and a UE 3 belongs to a cell C within a CoMP set. One CoMP set may operate in an MU-MIMO mode with respect to the UE 1, the UE 2 and the UE 3 and perform a CoMP operation. Within such a CoMP set, a serving cell of the UE 1 and the UE2 is the cell A, but the serving cell of the UE 3 is the cell C. Accordingly, there is no criterion for setting a serving cell from in the CoMP set for performing the CoMP operation in the MU-MIMO mode.

Accordingly, in this case, a BS which performs a CoMP operation may transmit the same CoMP reference signal based on a reference signal sequence of a BS, to which a specific UE among UEs for performing a CoMP MU-MIMO mode belongs. The BS which is used as a reference BS may be determined coordination between multiple cells which perform the CoMP operation. For example, a BS (or cell), to which most UEs which operate in a CoMP MU-MIMO mode belong, may be determined as a reference BS (or cell). If the reference BS is set, the remaining neighboring cells which perform the CoMP operation may generate reference signals having the same pattern based on the CoMP reference signal sequence of the reference BS and transmit the reference signals to the UE. At this time, if the reference BS is changed, the UE belonging to a neighboring cell which performs the CoMP operation may not be aware of the CoMP reference signal sequence of the changed BS.

In order to solve this problem, the BS needs to inform the UE of additional information in addition to information about single cell based MU-MIMO (e.g., information about a maximum number of UEs for operating in the MU-MIMO mode, the number of layers, etc.). That is, the BS needs to inform the UE of information about the reference signal sequence of the reference BS. The BS may directly inform the UE of the reference signal sequence of the reference BS, $V_{shift}$ information, etc. or inform the UE of the cell ID of the reference BS to deliver the CoMP reference signal information to the UE.

Figure 5:
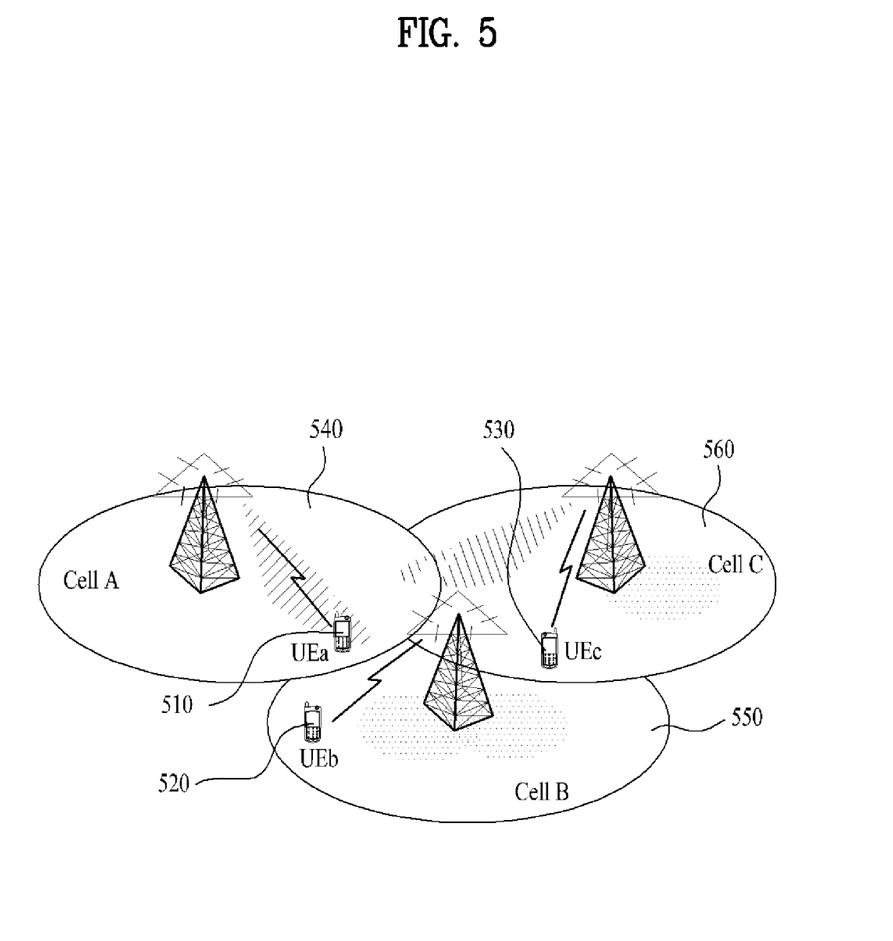
FIG. 5 is a diagram explaining a method of transmitting and receiving a CoMP reference signal according to various embodiments of the present invention.

FIG. 5 is a diagram explaining a method of transmitting and receiving a CoMP reference signal according to various embodiments of the present invention.

Referring to FIG. 5, a UE a 510 and a UE b 520 belong to a cell A 540 and a UE c 530 belongs to a cell C 560 to perform a CoMP operation. The cell A 540, the cell B 550 and the cell C 560 configure one CoMP set and perform MU-MIMO with respect to the UEs 510, 520 and 530. The CoMP set may generate and transmit a reference signal sequence based on the cell A including two UEs. Then, the BS 570 belonging to a serving cell becomes a reference BS. In the following description, it is assumed that the reference BS is a BS A 570.

At this time, the cell C 560 may inform the UE c 530 belonging to the cell C 560 of the ID of the cell A 540 or the CoMP reference signal sequence of the cell A 540 and $V_{shift}$ information and thus the UE c 530 may perform efficient channel estimation or data demodulation. The cells 550 and 560 which perform the CoMP operation may generate the same CoMP reference signal as the CoMP reference signal sequence of the reference BS 570 and transmit the CoMP reference signal to the UE in the same pattern.

Next, a method of generating and transmitting the same reference signal sequence based on a CoMP set ID will be described.

Unlike the above-described case in which multiple cells which perform the CoMP operation generate the reference signal based on the reference BS 570, a CoMP set ID may be set, a serving cell and neighboring cells which perform a CoMP operation may generate a CoMP reference signal sequence based on the same CoMP set ID and transmit the CoMP reference signal sequence to the UEs 510, 520 and 530 in the same CoMP reference signal pattern. At this time, the CoMP set ID may be defined in advance and the CoMP reference signal sequence corresponding to the CoMP set ID defined in advance may be defined in advance. In this case, the BSs 570, 580 and 590 which perform the CoMP operation may inform UEs belonging thereto of index information of the CoMP set ID so as to provide information about the CoMP reference signal.

As another method, one ID for a CoMP set and a CoMP reference signal sequence corresponding thereto may be defined in advance. The BSs 570, 580 and 590 which perform the CoMP operation may provide only 1-bit information indicating whether or not the CoMP operation is performed (on/off) to the UEs. Information about the CoMP reference signal sequence or the CoMP set ID defined in advance may be semi-statically delivered to the UEs 510, 520 and 530 through higher layer signaling.

Generation and transmission of the CoMP reference signal according to the present invention includes all cases of generating and transmitting the same CoMP reference signal sequence to UEs in the same pattern at multiple cells within the CoMP set. Various methods of generating and transmitting the CoMP reference signal sequence at the multiple cells within the CoMP set will now be described.

The cells 540, 550 and 560 which perform a coherent (or RF combining) JP scheme may generate the same CoMP reference signal using Equation 1 excluding different cell-specific frequency shift equations $v_{shift} = N_{ID}^{cell} \bmod 3$. In this case, the reference cell 540 to which a specific UE located at a cell boundary belongs may send an indication for the coherent JP mode to neighboring cells 550 and 560 such that the neighboring cells 550 and 560 turn a process of generating the $V_{shift}$ value from the reference signal sequence generated by the cell ID off.

The reference cell 540 may send the Cell ID information thereof to the neighboring cells 550 and 560 such that the neighboring cells 550 and 560 may generate the CoMP reference signal based on the cell ID of the reference cell 540 and transmit the CoMP reference signal to the UE in the same pattern. At this time, such indication information may be sent via an x2 interface or backhaul.

As another method, neighboring cells 550 and 560 which perform the CoMP operation may generate the CoMP reference signal sequence according to the $V_{shift}$ value of the reference cell 540. At this time, the CoMP reference signal sequence may be generated based on the IDs of the cells 540, 550 and 560.

As another method, a CoMP set ID for a coherent JP scheme may be defined in advance. The cells 540, 550 and 560 which perform the coherent JP scheme may generate a CoMP reference signal sequence corresponding to a CoMP set ID defined in advance and transmit data to the UEs 510, 520 and 530 along with the generated CoMP reference signal.

Information including one or more of the ID of the reference BS (or cell), the CoMP reference signal sequence, the $V_{shift}$ information, the CoMP set information or the CoMP operation on/off information may be referred to as "CoMP MU-MIMO information" for CoMP MU-MIMO or "CoMP reference signal information" for operation in the CoMP MU-MIMO mode.

The BS may inform the UE of "CoMP MU-MIMO information" through higher layer signaling. This information may be transmitted to the UE periodically or at an event-triggering time. Alternatively, the BS may transmit "CoMP MU-MIMO information" to the UE through L1/L2 control signaling.

In general, the BS transmits scheduling allocation information and other control information through a PDCCH. The physical control channel may be transmitted via one aggregate or a plurality of consecutive control channel elements (CCEs). One CCE includes 9 RE groups. The number of RE groups which are not allocated to a physical control format indicator channel (PCFICH) or a physical hybrid automatic repeat request indicator channel (PHICH) is $N_{REG}$. CCEs which can be used in a system are 0 to $N_{CCE}-1$ (here, $N_{CCE}=\lfloor N_{REG}/9 \rfloor$). The PDCCH supports multiple formats as shown in Table 2. One PDCCH composed of n consecutive CCEs starts from a CCE for performing i mode n=0 (here, i denotes a CCE number). Multiple PDCCHs may be transmitted via one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the BS may determine a PDCCH format depending on to how many regions control information is transmitted. In addition, the UE reads control information, etc. in CCE units, thereby reducing overhead. It is possible to distinguishably design a PDCCH of a downlink control information (DCI) format configured in a format according to control information to be transmitted by a serving BS. At this time, from the viewpoint that the existing DCI format is reused, a DCI format may be configured in a manner of using some fields of a certain DCI format and filling the other fields with an arbitrary value or zero padding. Information about such a DCI format may be transmitted to the UE.

As an example, it is assumed that simple scheduling for Rank 1 transmission of a single codeword is transmitted in a spatial multiplexing mode using a DCI format 1B (transmission 1 to a UE located at a cell boundary is generally performed with Rank 1). Table 3 shows an example of downlink control information transmitted using a DCI format 1B.

TABLE 3

| Information field | Bit(s) |
| --- | --- |
| Localized/distributed VRB assignment flag | 1 |
| Resource block assignment | $\lceil \log_2(N_{RB}^{DL})(N_{RB}^{DL}+1)/2 \rceil$ |
| Modulation and coding scheme | 5 |
| HARQ process number | 3(FDD), 4(FDD) |
| New data indicator | 1 |
| Redundancy version | 2 |
| TPC command for PUCCH | 2 |
| Downlink assignment index | 2 |
| TPMI information for precoding | 2 or 4 |
| PMI confirmation for precoding | 1 |

Referring to Table 3, DCI format 1B includes a plurality of information fields. The plurality of information fields may include a localized/distributed VRB assignment flag field, a resource block assignment field, a modulation and coding (MCS) scheme field, a HARQ process number field, a new data indicator field, a "TPC command for PUCCH" field, a downlink assignment index field, a "transmitted precoding matrix indicator (TPMI) information for precoding" field, and a "PMI confirmation for precoding" field.

Such a DCI format 1B may be configured as shown in Table 4 in order to support a JP scheme among CoMP schemes.

TABLE 4

| Information field | Bit(s) |
| --- | --- |
| Localized/distributed VRB assignment flag | 1 |
| Resource block assignment for CoMP zone | $\lceil \log_2(N_{RB}^{DL})(N_{RB}^{DL}+1)/2 \rceil$ |
| Modulation and coding scheme | 5 |
| HARQ process number | 3(FDD), 4(FDD) |
| New data indicator | 1 |
| Redundancy version | 2 |
| TPC command for PUCCH | 2 |
| Downlink assignment index | 2 |
| CoMP MU-MIMO information | 5 |

Referring to Table 4, the number of bits of each information field is merely exemplary and the sizes of the information fields are not limited thereto. Information having the same size as the DCI format for SU-MIMO and MU-MIMO may be transmitted in order to ensure downlink transmission commonality regardless of a transmission mode.

Since the UE which performs the CoMP operation is based on a demodulation reference signal received from multiple cells, information bits for PMI may be deleted. In a space ensured through deletion of information bits, "CoMP MU-MIMO information" may be transmitted. Since CoMP MU-MIMO information is changed, some fields may be used and the other fields may be filled with an arbitrary value or zero padding.

Alternatively, a power offset field may be added for single-cell based MU-MIMO transmission, an assignment flag may be maintained in order to support localized/distributed assignment, TPMI information may be maintained in order to efficiently select precoding used for MU-MIMO transmission, CoMP MU-MIMO information may be added if the PMI confirmation bits indicating frequency-selective PMI are deleted. Information about such a DCI format is shown in Table 5.

TABLE 5

| Information field | Bit(s) |
|---|---|
| Localized/distributed VRB assignment flag | 1 |
| Resource block assignment for CoMP zone | $\lceil \log_2(N_{RB}^{DL})(N_{RB}^{DL}+1)/2 \rceil$ |
| Modulation and coding scheme | 5 |
| HARQ process number | 3(FDD), 4(FDD) |
| New data indicator | 1 |
| Redundancy version | 2 |
| TPC command for PUCCH | 2 |
| Downlink assignment index | 2 |
| Downlink power offset | 1 |
| CoMP MU-MIMO information | 4 |

Figure 6:
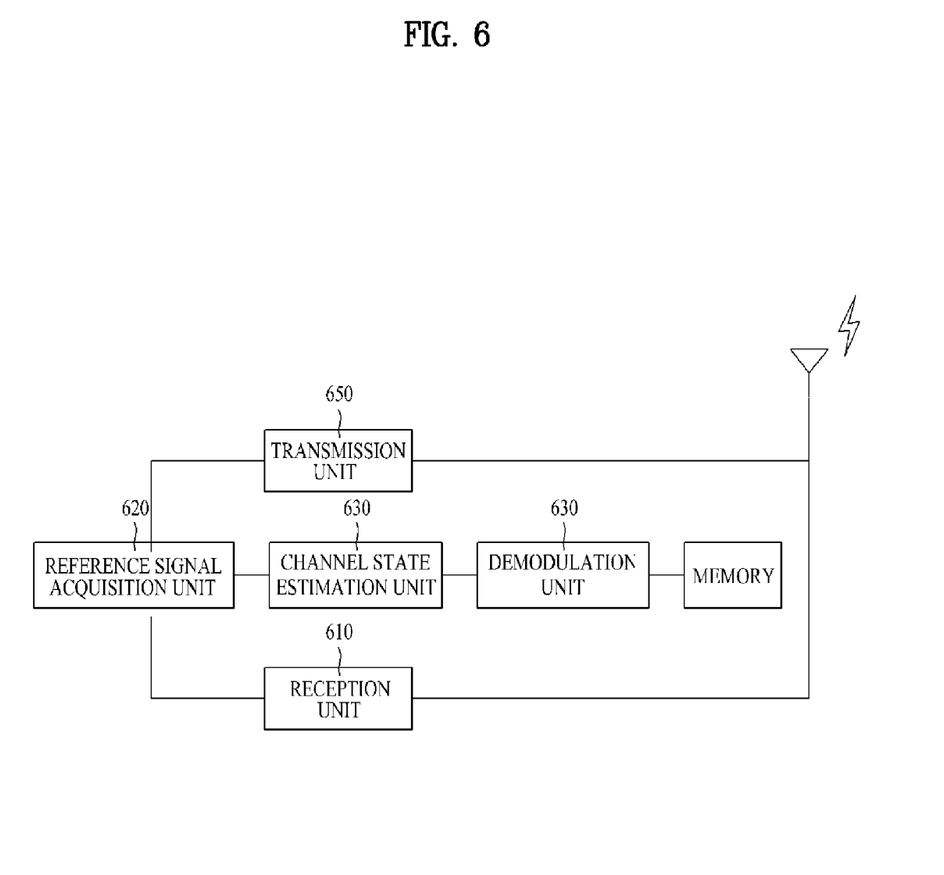
FIG. 6 is a diagram showing the configuration of a user equipment (UE) according to an exemplary embodiment of the present invention.

FIG. 6 is a diagram showing the configuration of a user equipment (UE) according to an exemplary embodiment of the present invention.

Referring to FIG. 6, a UE may include a reception unit 610, a reference signal acquisition unit 620, a channel state estimation unit 630, a demodulation unit 640, a transmission unit 650 and a memory 660.

The reception unit 610 may receive reference signal information of a reference BS within a CoMP set or cell ID information of the reference BS from a BS to which the UE belongs in a CoMP set for performing the CoMP operation.

The reference signal acquisition unit 620 may acquire a reference signal of the reference BS using the received reference signal information of the reference BS or cell ID information of the reference BS. At this time, the reference signal of each BS may be generated in the same pattern as the reference signal of the reference BS.

The channel state estimation unit 630 may estimate a channel state using the acquired reference signal of the reference BS and a reference signal of a BS to which a specific UE belongs.

The demodulation unit 640 may demodulate data received from the BS. The transmission unit 650 may transmit various signals, data and information to each BS. The memory 660 may store computed information or information received from an external device for a predetermined time and may be replaced with a component such as a buffer (not shown).

Figure 7:
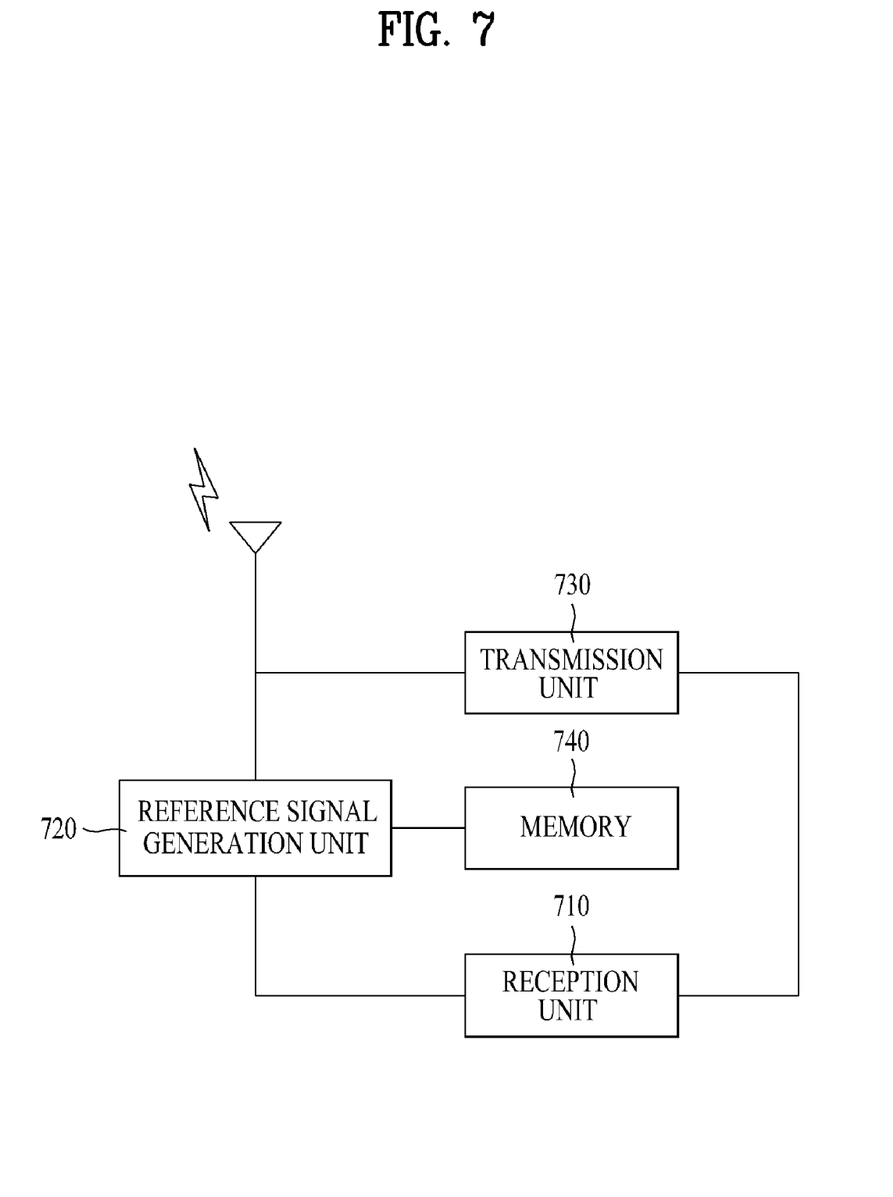
FIG. 7 is a diagram showing the configuration of a BS according to an exemplary embodiment of the present invention.

FIG. 7 is a diagram showing the configuration of a BS according to an exemplary embodiment of the present invention.

Referring to FIG. 7, the BS may include a reception unit 710, a reference signal generation unit 720, a transmission unit 730 and a memory 740.

The reception unit 710 may receive reference signal information of a reference BS within a CoMP set which performs a CoMP operation or cell ID information of the reference BS.

The reference signal generation unit 720 may generate a reference signal in the same pattern as the reference signal of the reference BS using the received cell ID information of the reference BS or reference signal information of the reference BS.

The transmission unit 730 may transmit the generated reference signal to a UE. The memory 740 may store computed information or information received from an external device for a predetermined time and may be replaced with a component such as a buffer (not shown).

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

[Industrial Applicability]

The apparatus and method for transmitting and receiving a CoMP reference signal are applicable to a wireless communication system such as a 3GPP LTE system, an LTE-A system or an IEEE 802.16 system.

The invention claimed is:

1. A method of receiving a coordinated multi-point (CoMP) reference signal in a wireless communication system that supports a multiple user-Multiple Input Multiple Output (MU-MIMO) scheme in a CoMP set for performing a CoMP operation, the method comprising:
   receiving, at a specific user equipment (UE), reference signal information of a reference base station (BS) within the CoMP set or cell identification (cell ID) information of the reference base station from a base station to which the specific user equipment (UE) belongs in the CoMP set;
   acquiring, at the specific user equipment, a reference signal of the reference base station using the received reference signal information of the reference base station or cell ID information of the reference base station; and
   performing channel estimation or demodulating received data using the acquired reference signal of the reference base station and a reference signal of the base station to which the specific UE belongs,
   wherein the reference base station is one base station, among a plurality of base stations, that has the most UEs performing the CoMP operation.

2. The method according to claim 1, wherein the reference base station is determined by coordination between base stations which perform the CoMP operation.

3. The method according to claim 1, wherein the reference signal information of the reference base station includes reference signal sequence information of the reference base station and frequency shift information.

4. A method of transmitting a coordinated multi-point (CoMP) reference signal in a wireless communication system that supports a multiple user-Multiple Input Multiple Output (MU-MIMO) scheme in a CoMP set, the method comprising:
   receiving reference signal information of a reference base station within the CoMP set or cell identification (Cell ID) information of the reference base station;
   generating a reference signal using the received cell ID information of the reference base station or reference signal information of the reference base station; and
   transmitting the generated reference signal to a user equipment (UE),
   wherein the reference base station is one base station, among a plurality of base stations, that has the most UEs performing a CoMP operation.

5. The method according to claim 4, wherein the reference base station is determined by coordination between base stations within the CoMP set for performing the CoMP operation.

6. The method according to claim 5, wherein the generating the reference signal includes generating a reference signal sequence by excluding a frequency shift value corresponding to frequency shift information in the received reference signal information of the reference base station.

7. The method according to claim 4, wherein the reference signal information of the reference base station includes reference signal sequence information of the reference base station and frequency shift information.

8. A user equipment (UE) for receiving a coordinated multi-point (CoMP) reference signal in a wireless communication system that supports a multiple user-Multiple Input Multiple Output (MU-MIMO) scheme in a CoMP operation mode, the UE comprising:
- a reception unit configured to receive reference signal information of a reference base station within the CoMP set or cell identification (cell ID) information of the reference base station from a base station to which a specific UE belongs in the CoMP set for performing the CoMP operation;
- a reference signal acquisition unit configured to acquire a reference signal of the reference base station using the received reference signal information of the reference base station or cell ID information of the reference base station; and
- a channel estimation unit configured to perform channel estimation or demodulate received data using the acquired reference signal of the reference base station and a reference signal of the base station to which the specific UE belongs,
- wherein the reference base station is one base station, among a plurality of base stations, that has the most UEs performing the CoMP operation.

9. A base station for transmitting a coordinated multi-point (CoMP) reference signal in a wireless communication system that supports a multiple user-Multiple Input Multiple Output (MU-MIMO) scheme in a CoMP operation, the base station comprising:
- a reception unit configured to receive reference signal information of a reference base station within the CoMP set for performing the CoMP operation or cell identification ( cell ID) information of the reference base station;
- a reference signal generation unit configured to generate a reference signal using the received cell ID information of the reference base station or reference signal information of the reference base station; and
- a transmission unit configured to transmit the generated reference signal to a user equipment (UE),
- wherein the reference base station is one base station, among a plurality of base stations, that has the most UEs performing the CoMP operation.

* * * * *